United States Patent [19]
Keaney

[11] Patent Number: 5,088,440
[45] Date of Patent: Feb. 18, 1992

[54] INDICATOR FOR AN INDICATING DEVICE

[76] Inventor: Carl J. Keaney, P.O. Box 1082, Knoxville, Tenn. 37901

[21] Appl. No.: 636,074

[22] Filed: Dec. 28, 1990

[51] Int. Cl.⁵ ............................................. G01D 13/00
[52] U.S. Cl. ..................... 116/298; 116/284; 368/77; 368/233; 368/234
[58] Field of Search ................. 40/118, 472, 501, 527, 40/529; 116/243, 278, 298, 302, 318, 322, 327; 368/77, 233, 234

[56] References Cited

U.S. PATENT DOCUMENTS 2,177,234 10/1939 Walser .................................. 368/77

FOREIGN PATENT DOCUMENTS 0662803 5/1979 U.S.S.R. ............................. 116/243

Primary Examiner—William A. Cuchlinski, Jr.
Assistant Examiner—W. Morris Worth

[57] ABSTRACT

An indicating mechanism is described. The mechanism is ideally suited for the indication of time but is also applicable to other indicating functions where changing information must be displayed. The mechanism is composed of a flexible belt bearing indicia and three supportive discs. As the discs are caused to rotate, the belt and any indicia on it will rotate. This rotation will be apparent to users who see or touch the indicia on the belt, thus providing an indicating function. The unique geometry of the belt gives two full circular discoidal surfaces for decoration. Typically only one of these surfaces will be visible to users as the other is disposed directly below it. This arrangement allows times within each 12 hour period in the 24 hour day cycle to be indicated uniquely while maintaining the conventional location of each AM and PM hour's representation of the clock face.

8 Claims, 8 Drawing Sheets

INDICATOR FOR AN INDICATING DEVICE

BACKGROUND OF THE INVENTION

This invention relates generally to a device having a viewable indicator and relates, more particularly, to the viewable or exposed components of such an indicator.

Devices such as clocks, watches or other time keeping devices commonly include a visual indicator comprised of a circular disc or dial and hands or other moving markers which must be viewed in order to obtain the information measured or monitored by the device.

Typically these devices complete a full cycle of their display within 12 hours, and thus indicate two points in time each day in the same manner—which is ambiguous.

Devices are also known which have a 24 hour cycle but do not use the standard positions of the 12 hour clock face to represent both daily occurrences of the same numerical time. That is, in these devices 7:00 AM (anti-meridian) and 7:00 PM (post-meridian) would not both be indicated at the typical 7:00 position. Thus use of these devices requires some education on the part of the user.

It is further noted that existing devices typically allow design or decoration over an area limited to the circular face of the device and that devices which allow greater display area are usually less compact or rely on maintaining some transparency of the decorated surfaces thus limiting the quality of the graphics.

Other devices which attempt to overcome these difficulties are known but these rely on overly complicated mechanisms thus reducing their reliability and manufacturability.

An object of the present invention is to provide a unique and interesting visual indicating mechanism. It is also an object of the present invention to provide an indicating mechanism which renders a unique visual display for each time of the day, thus distinguishing each AM time from its PM counterpart while allowing both AM and PM times to be indicated at their usual positions on the clock face.

A further object of the present invention is to provide a greater surface area for display or decoration and to do so without depending on the co-action of semi-transparent layers for the achievement of the display function.

Another object of the present invention is to provide the aforementioned improvements in a compact and uncomplicated mechanism.

SUMMARY OF THE INVENTION

This invention resides in a flexible belt for use as an indicator of an indicating device having a shaft which rotates about an axis during use of the device.

The belt is comprised of a first discoidal side portion including a first face having a circular periphery, a small circular hole in the center and a slit having two sides which extend radially across the first face from the periphery of the small circular hole in the center to the circular periphery thereof and a second discoidal side portion including a second face having a circular periphery, a small circular hole in the center and a slit having two sides which extend radially across the second face from the periphery of the small circular hole in the center to the circular periphery thereof. The first and second side portions are arranged in a back-to-back relationship so that the faces thereof face in opposite directions and so that the slits thereof are positioned in registry and provide a single two-sided gap extending from the periphery of the small circular holes in the center of each face to the circular periphery thereof. The first and second side portions are joined to one another along each side of the two-sided gap and are connectable to the rotatable shaft of the indicating device for rotation of one of the first and second side portions relative to the other of the side portions about an axis extending through the centers of the faces so that as the first and second side portions are rotated relative to one another as aforedescribed, at least a sector of the first side portion moves through the two-sided gap to the belt side corresponding with the face of the second side portion and at least a sector of the second side portion moves through the two-sided gap to the belt side corresponding with the face of the first side portion. Therefore, as the face of one side portion is viewed frontally and the first and second side portions are rotated relative to one another as aforedescribed, a sector of the face of the belt side portion being viewed disappears through the gap and a sector of the face of the opposite belt side portion appears through the gap.

DETAILED DESCRIPTION OF PREFERRED EMBODIMENTS

Figure 1:
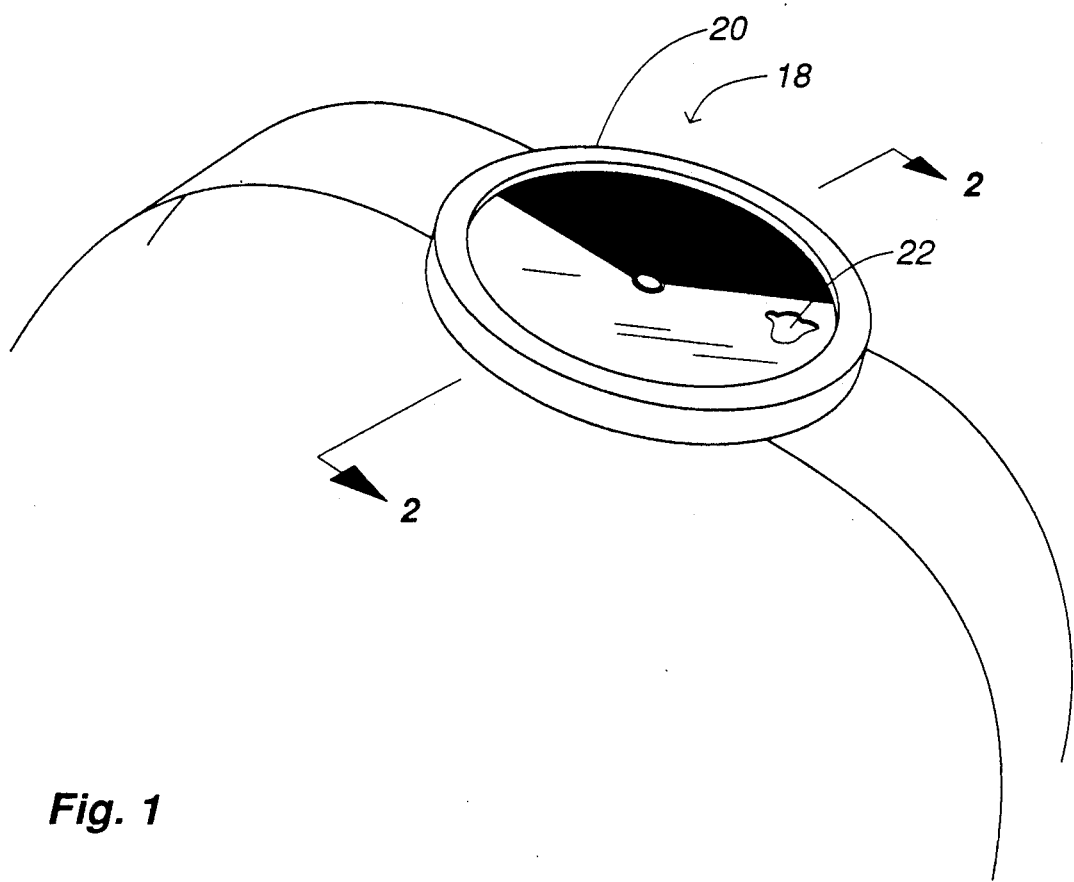
FIG. 1 is a perspective view of a wrist watch within which an embodiment of the present invention is incorporated.
Figure 9:
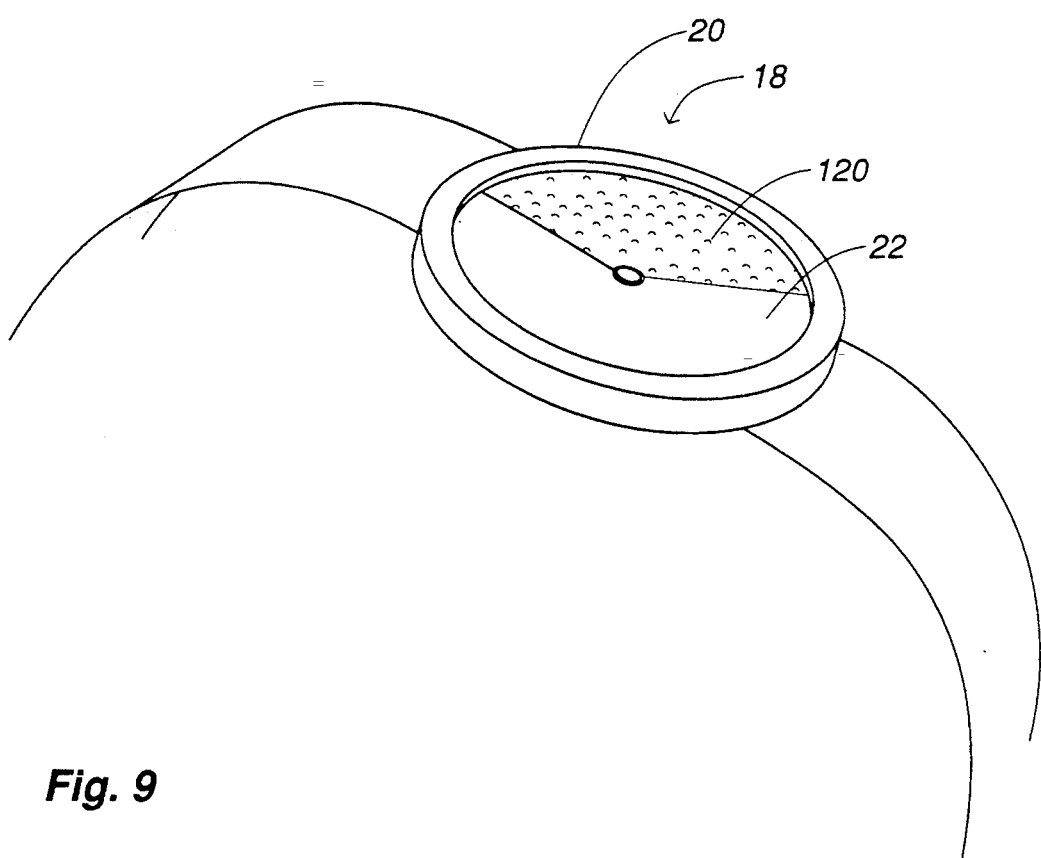
FIG. 9 is a perspective view of a wrist watch within which an alternative embodiment of the present invention is incorporated.

With reference to FIG. 1, there is illustrated a watch 20 including indicating means 18 embodying the present invention. As will be apparent herein, the watch 20 is used for measuring time throughout a time interval of twenty-four hours, and the indicating means 18 visually indicate to a user the time within the measured twenty-four hour time period. However, it will be understood that indicating means in accordance with the broader aspects of the invention may be utilized as a visual indicating mechanism of other types of viewable indicators, such as clocks, meters or gauges. With reference to FIG. 9, it is also noted that the indicating mechanism of the present invention may be adapted for tactile use by the application of textured indicia 120. Accordingly, the principles of the present invention may be variously applied.

Figure 2:
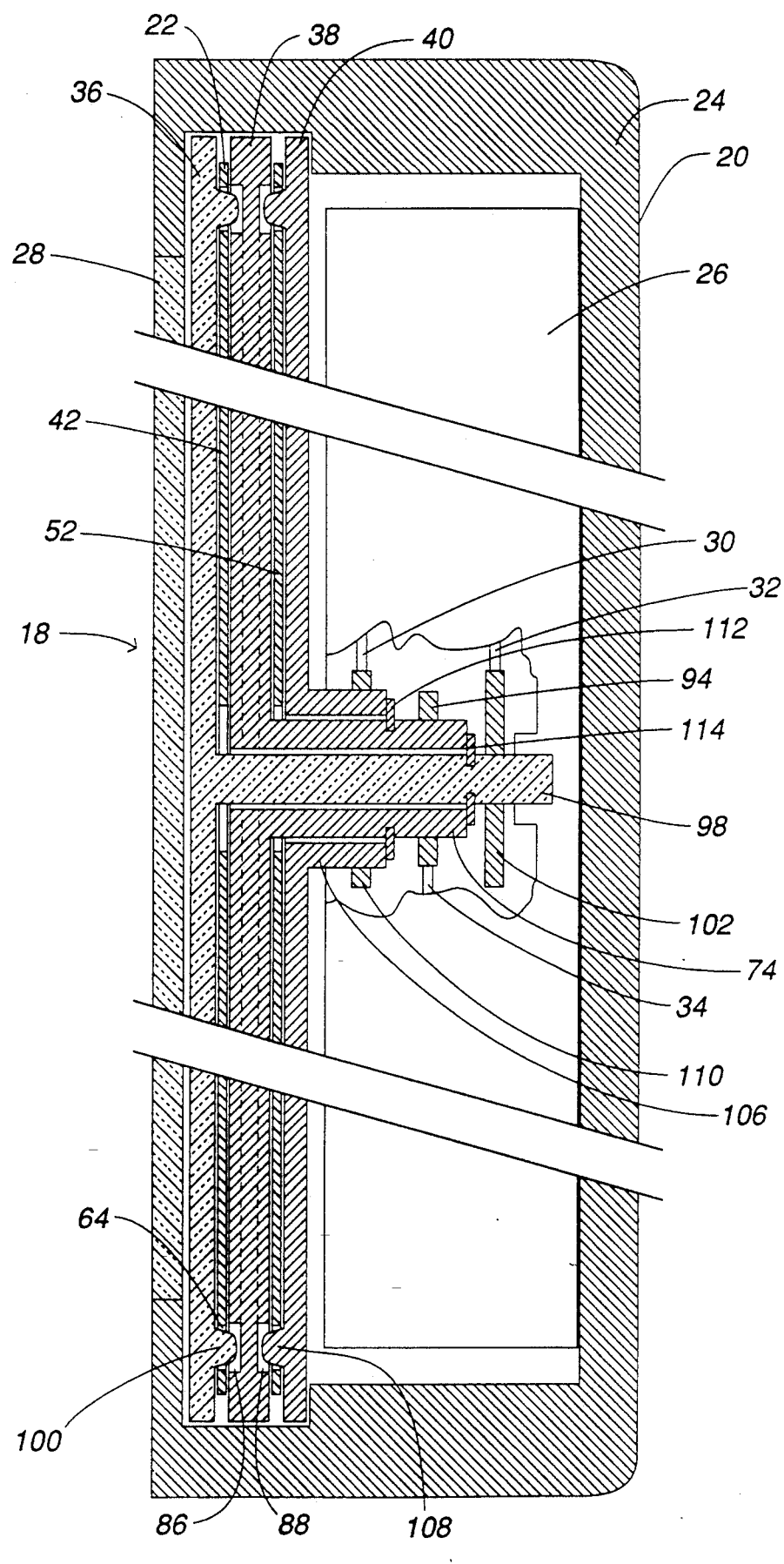
FIG. 2 is a cross-sectional view taken along line 2—2 of FIG. 1.

As best shown in FIG. 2, the watch 20 includes a casing 24 within which the moving means 26 (for moving the indicating means 18 in the manner described herein) and the indicating means 18 are mounted. The indicating means 18 is supported within the moving means 26 and the moving means 26 is supported within the casing. The indicating means 18 is positioned so as to overlie the moving means 26, and a transparent protective cover 28 is supported by the casing 24 so that the indicating means can be viewed through the cover 28. Associated with the moving means 26 are at least three gears, two 30, 32 of which are driven to rotate in opposite directions at the rate of one revolution for every twelve hour time period and, to this end, are equivalent to the hour-hand drive means in conventional watches. The third gear 34 is connected to a shaft which can be rotated by the user of the device and fixed to prevent rotation between adjustments by the user.

As best shown in FIG. 2, the indicating means 18 includes a flexible belt 22, a top support disc 36, a middle support disc 38 and a bottom support disc 40. Referring now to FIG. 4A, the flexible belt 22 includes a first discoidal side portion 42 including a first face 44 having a circular periphery 46 a small circular hole 48 in the center and a slit 50 having two sides which extend radially across the first face 44 from the periphery of the hole in the center 48 to the circular periphery 46. The belt 22 also includes a second discoidal side portion 52 including a second face 54 having a circular periphery 56 a small circular hole 58 in the center and a slit 60 having two sides which extend radially across the second face 54 from the periphery of the hole in the center 58 to the circular periphery 56.

Figure 3:
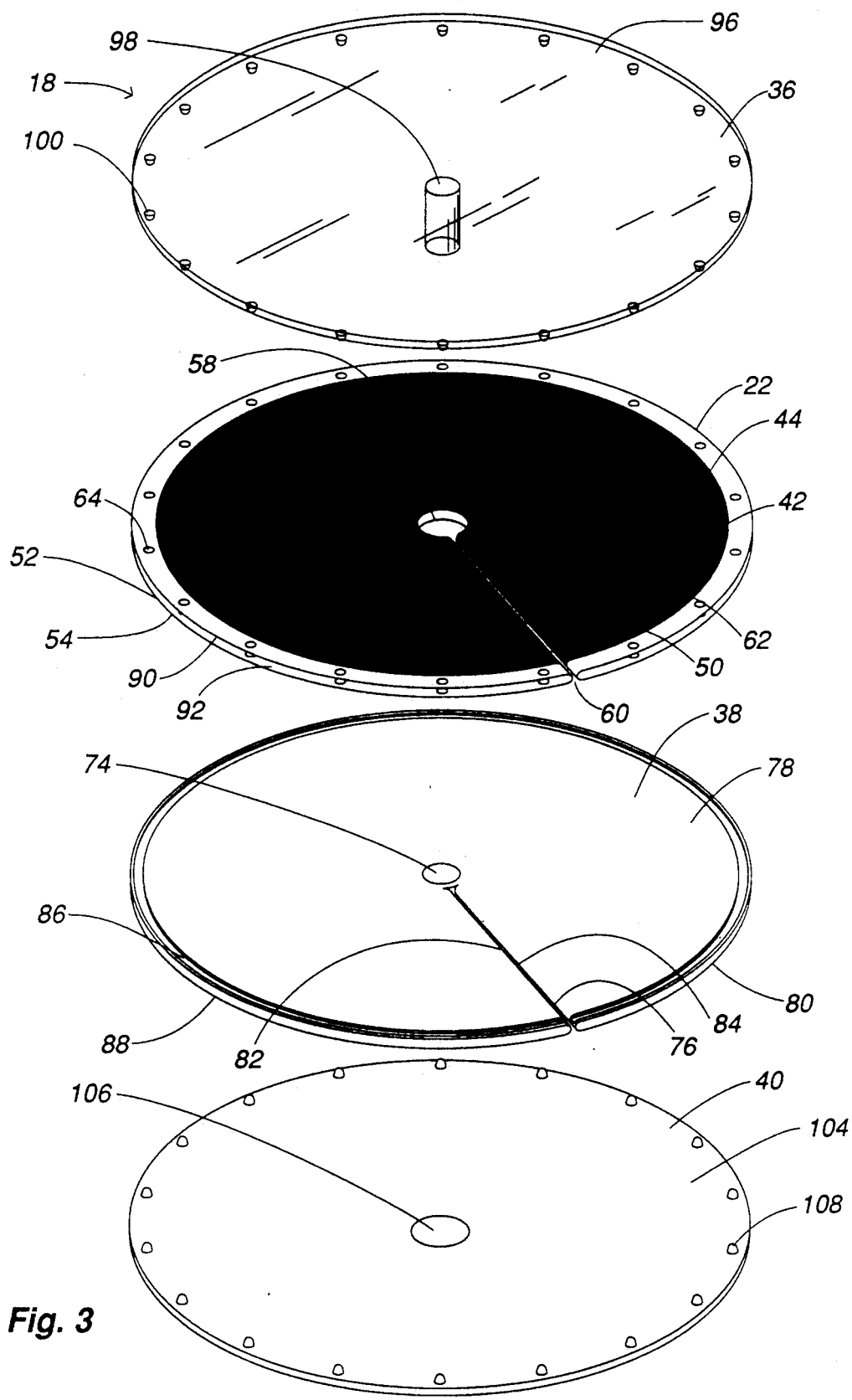
FIG. 3 is an exploded perspective view of various components of the invention as embodied in the FIG. 1 watch.

With reference to FIGS. 3 and 4A, the first and second side portions 42, 52 are arranged in back-to-back relationship so that the faces 44 and 54 face in opposite directions and so that the slits 50 and 60 are positioned in registry and provide a single two-sided gap 62 extending generally from the center of each face to the circular periphery thereof. Positioned in this back-to-back relationship, the first and second side portions 42, 52 are arranged generally in closely-spaced parallel planes. In addition, the first and second side portions 42, 52 are joined to one another along each side of the two-sided gap from their circular peripheries 46 and 56 to the peripheries of the holes in their centers 48 and 58 thus forming the belt 22. The flexibility of the belt 22 permits the first and second side portions 42, 52 to be rotated relative to one another about a central axis X' (FIG. 4A) oriented generally perpendicular to the first and second side portions 42, 52 so that as the first and second side portions 42, 52 are rotated relative to one another about the central axis X', at least a sector of the first side portion 42 moves through the two-sided gap 62 to the belt side corresponding with the face 54 of the second side portion 52 and at least a sector of the second side portion 52 moves through the two-sided gap 62 to the belt side corresponding with the face 44 of the first side portion 42. Therefore, as the face of one belt side portion is viewed frontally and the first and second side 42, 52 are rotated relative to one another about the axis X', a sector of the face of the belt side portion being viewed disappears through the gap 62 and a sector of the face of the opposite belt side portion appears through the gap 62.

To provide the belt 22 with a desired degree of flexibility, the belt is constructed of a flexible material, such as a suitable plastic, and is relatively thin. To facilitate the rotation of the first and second side portions 42 and 52 relative to one another when mounted within the watch 20, each side portion 42, 52 includes a series of regularly-spaced holes or perforations 64 extending along its periphery.

As will be apparent herein, a user of the watch 20 is provided with an indication of the time of day by looking through the transparent cover 28 and observing the position of the belt side portions 42, 52 relative to one another. To facilitate the recognition of the relative position of the belt side portions 42, 52, the faces 44 and 54 of the side portions 42 and 52 of the depicted belt are of contrasting color. More specifically, the face 44 of the belt side 42 is colored white while the face 54 of the belt side portion 52 is colored black. The black and white regions, indicated 66 and 68 (FIGS. 4 and 6) respectively, of the belt side portions 42, 52 meet one another along a pair of radial paths 70 and 72 extending from the center of the belt to the periphery thereof. Therefore, during use of the watch wherein a portion of the dark region 66 appears through the gap 62 and a portion of the white region 68 disappears through the gap 62, the user is provided with a visual indication of the relative positions between the first and second side portions 42, 52 by viewing the position of one of the viewable radial paths 70 or 72 relative to the casing 24.

With reference again to FIG. 3, the middle support disc 38 is in the form of a disc-like body having a circular periphery, a hollow shaft 74 and defining a gap 76 extending from the center of the body to the periphery thereof. One side of the body provides a top surface 78 and the other side of the body provides a bottom surface 80. The top and bottom surfaces are joined by arcuate surfaces 82, 84 extending through the gap 76. For a reason apparent herein, each of the top and bottom surfaces 78 and 80 define a groove 86 and 88, respectively, extending along its periphery.

When the belt 22 is positioned upon the middle support disc 38, the back 90 of the first side portion 42 opposite the face 44 engagably overlies the disc top surface 78 and the back 92 of the second side portion 52 opposite the face 54 is engagably overlain by the disc bottom surface 80 and the shaft 74 fits through the center hole 58 in the second side portion 52. During relative movement of the first and second side portions 42, 52 relative to one another, the backs 90 and 92 of the first and second side portions 42, 52 slidably move along the top and bottom surfaces 78, 80 of the disc 38 and move between the top and bottom surfaces 78, 80 as the backs 90 and 92 of the first and second side portions 42, 52 slidably move across the arcuate surfaces 82, 84 of the gap 76. In the depicted embodiment, the middle support disc 38 is rigid and constructed of, for example, suitable plastic and the surfaces of its top 78, bottom 80 and gap 76 are finished so as to provide a relatively low frictional resistance as the belt portions 42, 52 are slidably moved thereacross. As seen in FIG. 2 in the depicted embodiment, the shaft 74 of the middle support disc 38 is keyed or otherwise fixedly attached to the gear 94. Gear 94 in turn meshes with gear 34 which is mounted in mechanism 26.

With reference to FIG. 3, the top support disc 36 includes a circular disc portion 96 having a shaft 98 and a plurality of teeth 100 on its underside, which are regularly spaced about its periphery facing downward. As seen in FIG. 2, the shaft 98 of the top support disc 36 is keyed or otherwise fixedly attached to the gear 102. Gear 102 in turn meshes with gear 32 which is mounted within mechanism 26. Again referring to FIG. 3, the bottom support disc 40 includes a circular disc portion 104 having a hollow shaft 106 and a plurality of teeth 108 on its top side which are regularly spaced about its periphery facing upward. As seen in FIG. 2 the shaft 106 of the bottom support disc 40 is keyed or otherwise fixedly attached to the gear 110. Gear 110 in turn meshes with gear 30 which is mounted within mechanism 26.

In the depicted embodiment, the bottom support disc 40 is constructed of a rigid material such as a hard plastic and the top support disc 36 is constructed of a transparent, rigid material, such as a hard transparent plastic.

As seen in FIG. 2 the flexible belt 22 is fitted onto the middle support disc 38. The top support disc 36 is fitted onto the belt 22 from above while the bottom support disc 40 is fitted onto the belt 22 from below.

When the top and bottom discs 36 and 40 are in assembled relation with the belt 22, their teeth 100 and 108 are matingly received by the perforations 64 defined along the circular periphery of the belt 22. The teeth 100 and 108 are accomodated in their extention through the perforations 64 in belt 22 by grooves 86 and 88 defined along the circular periphery of the middle support disc 38. These grooves can be seen more clearly in FIG. 3.

Again, in FIG. 2, it can be seen that components 22, 36, 38, and 40 are arranged so that their centers are aligned. The hollow shaft 98 of disc 36 fits through the hollow shaft 74 of disc 38 which fits through the hollow shaft 106 of disc 40. These shafts are of different lengths so that in the assembly shaft 98 will protrude below shaft 74 and shaft 74 will protrude below shaft 106.

After the components 22, 36, 38 and 40 are assembled, the mechanism comprised of them may be maintained as an assembly by a variety of conventional means which allow free and independent rotation of all of the shafts. For the purpose of illustration the assembly is shown in FIG. 2 being held together by the action of two retaining rings 112 and 114. Ring 112 is fitted to shaft 74 and keeps disc 40 from sliding downward. Ring 114 is fitted to shaft 98 and keeps disc 38 from sliding downward. This arrangement is in keeping with the convention in ordinary time pieces of providing a means for the rotation—in either direction—of a series of concentric rotatable shafts.

Thus assembled, the mechanism can be supported in a conventional casing such as 24 in FIG. 2, by a variety of conventional means. For illustrative purposes the shafts of the mechanism 18 are shown supported within moving means 26 in such a way that each shaft is free to rotate, with the disc or belt to which it is connected, clockwise or counter clockwise about its central axis (X' in FIG. 4A).

Figure 4:
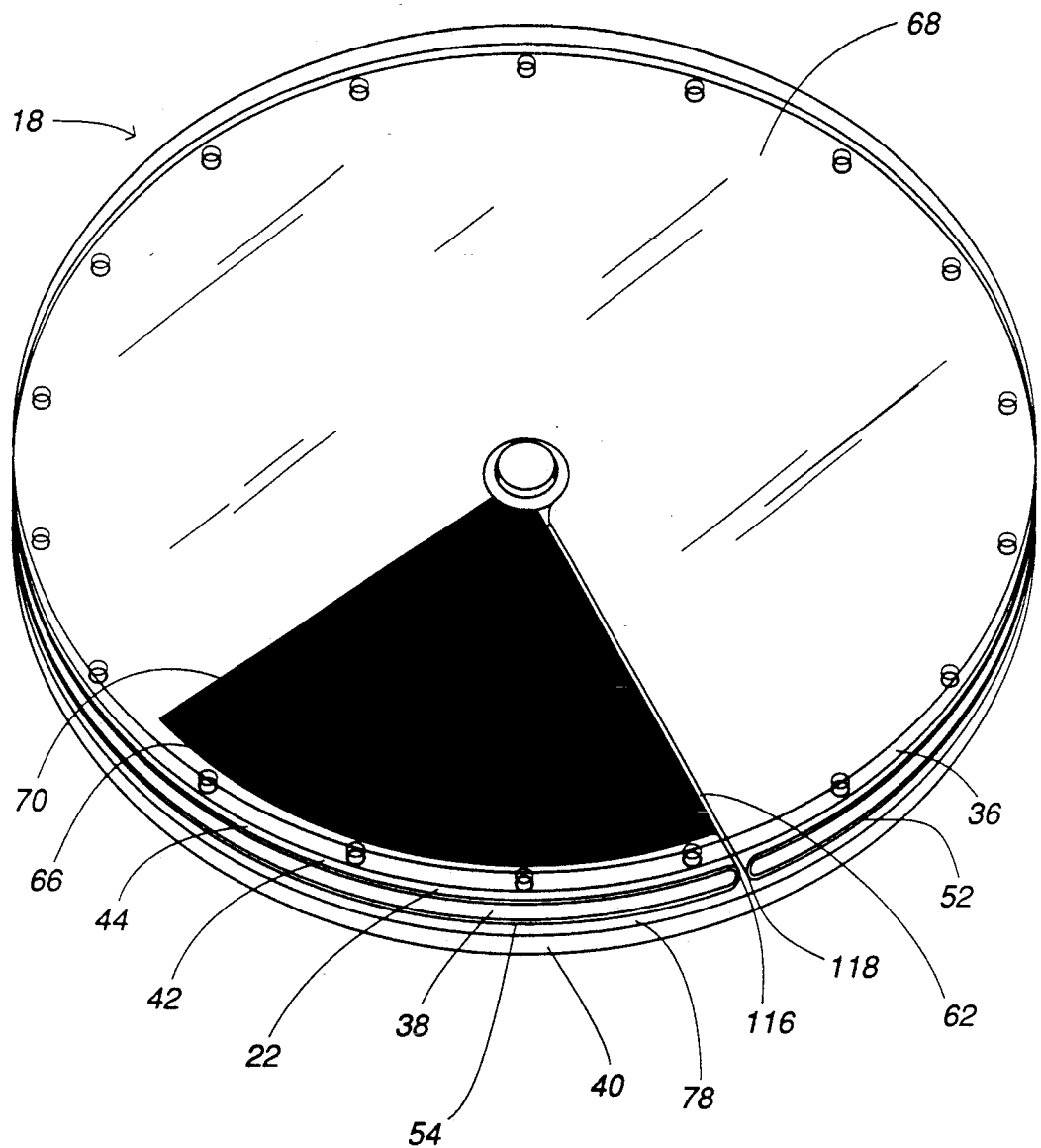
FIG. 4 is a perspective view of the various components illustrated in FIG. 3, shown assembled.
Figure 4A:
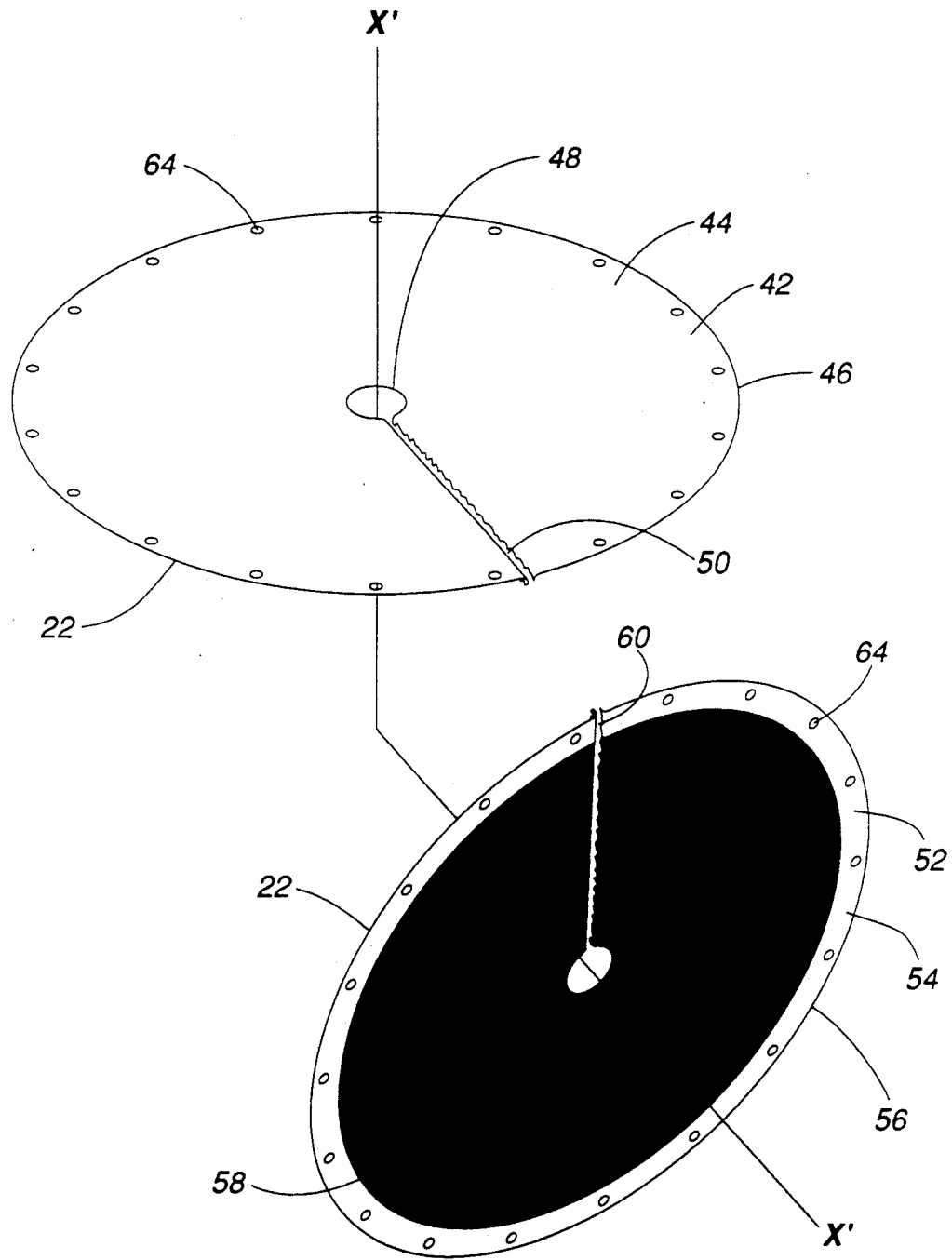
FIG. 4A is a perspective view of the belt of the FIG. 4 assembly shown with its side portions separated from one another.
Figure 5:
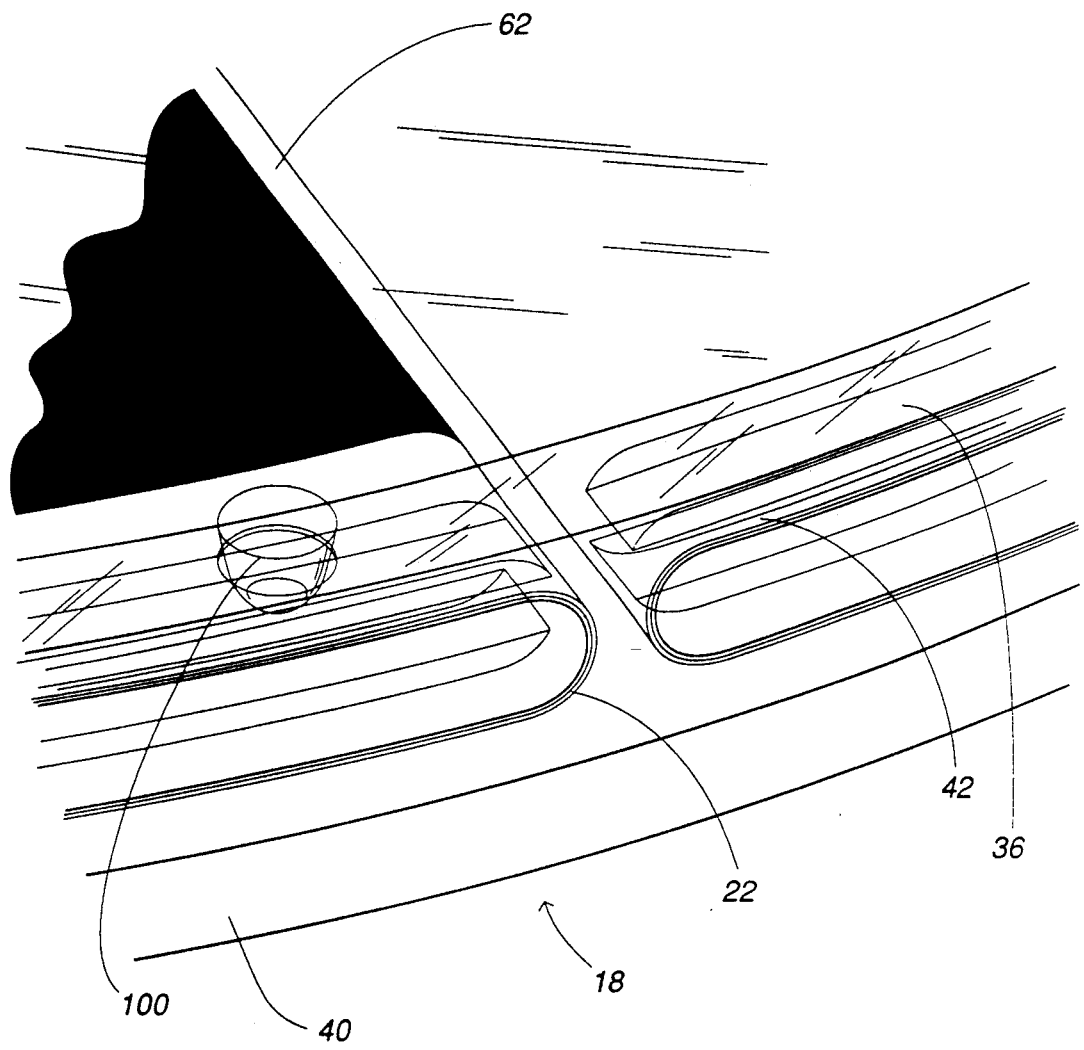
FIG. 5 is a perspective view of a fragment of the assembled components illustrated in FIG. 4, drawn to a larger scale.

Referring now to FIGS. 2, 4 and 5. The invention involves two fundamental movements which can provide an indicating function either singly or simultaneously: the belt 22 can be made to revolve and the gap 62 in the belt 22 can be made to move.

Clockwise movement of the first side portion 42 of the belt 22 occurs as follows: the top support disc 36 is driven at gear 102 on shaft 98 by gear 32 to rotate clockwise and simultaneously the bottom support disc 40 is driven at gear 110 on shaft 106 by gear 30 to rotate anticlockwise at the same rate. As can be seen in FIG. 2 the teeth 100 of the top support disc 36 and the teeth 108 of the bottom support disc 40 will engage the holes 64 in the belt 22. Thus causing the first side portion 42 of the belt 22 to move clockwise while the second side portion 52 of the belt 22 will move anticlockwise. As can be seen in FIG. 4, as the first side portion 42 of the belt 22 rotates it moves in an arc from the edge 116 of the gap 62 around clockwise to the other edge 118 of the gap 62 and rolls down to the second side portion 52 of the belt 22. As the second side portion 52 of the belt 22 rotates it moves in an arc from the edge 118 of the gap 62 around anticlockwise to the other edge 116 of the gap 62 and rolls up to the first side portion 42 of the belt 22. Anticlockwise movement of the first side portion 42 of the belt 22 would occur in exactly the opposite fashion.

An indicating function is derived from the movement of the belt 22 by marking or otherwise differentially distinguishing any portion of it in such a way that this can be detected by a user of the device. In a preferred embodiment the belt 22 will have contrasting colors such as black and white each applied to exactly one half of its area in such a way that if the entire first face 44 of the first side portion 42 of the belt 22 is one color then the entire second face 54 of the second side portion 52 of belt 22 is the other color, with the color fields meeting at two perpendicular radial paths which would lie along the centers of the edges 116 and 118 of the gap 62. As the belt 22 rotates these radial paths between the color fields will revolve and this will be readily apparent to users of the device observing through the top support disc 36 and the protective cover 28 (FIG. 2) which are both transparent.

The effect of this can be seen in FIG. 4. If the first face 44 of the first side portion 42 of the belt 22 starts out entirely composed of the white colored area of the belt 22 and the second face 54 of the second side portion 52 of the belt 22 starts out entirely composed of the black colored area of the belt 22 and the belt 22 is driven clockwise as described above then the radial path 70 between the black region 66 and the white region 68 will move in a circular arc appearing at 116 and disappearing at 118. As path 70 disappears at 118 the other path (72 in FIGS. 6 and 7) between the two colors will emerge at 116 and circle around to 118 completing one full cycle of the belt.

Note that it is this aspect—two full circular transitions per cycle—that allows the distinct indication of each twelve hour period in the twenty-four hour day.

Figure 6:
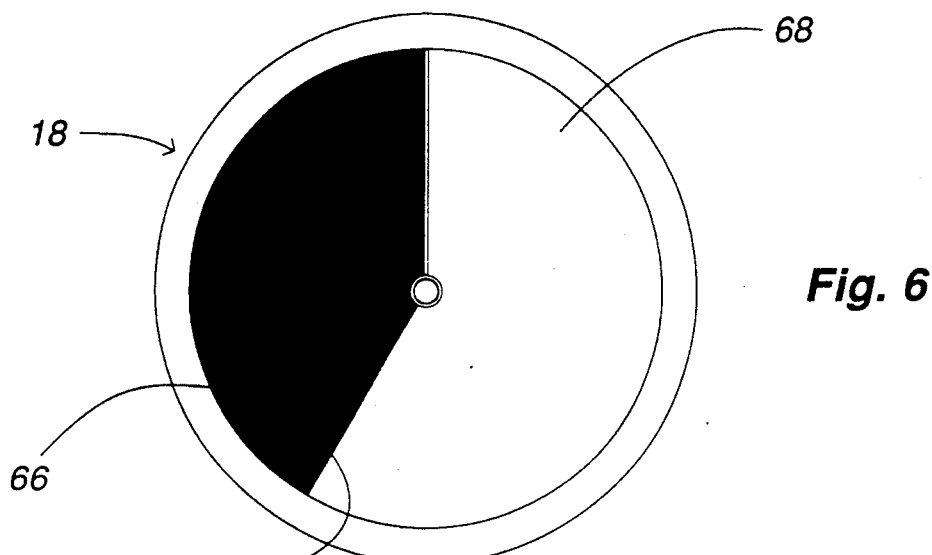
FIG. 6 is a plan view of the FIG. 1 watch.
Figure 7:
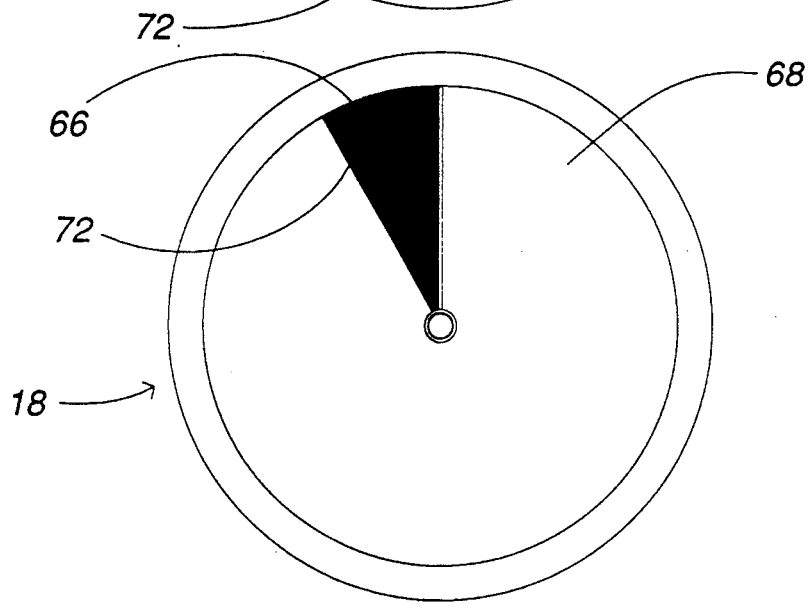
FIG. 7 is a plan view of the FIG. 1 watch.
Figure 8:
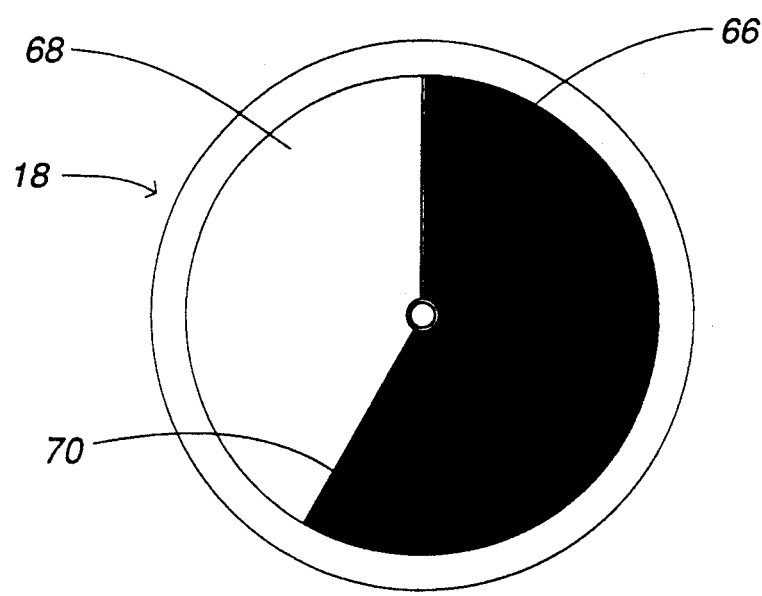
FIG. 8 is a plan view of the FIG. 1 watch.

FIGS. 6, 7 and 8 show a sequence of times and how they would be indicated by the device as protrayed in this preferred embodiment. In FIG. 6, the time indicated is 7:00 AM. In FIG. 7, the time indicated is 11:00 AM. And in FIG. 8, the time indicated is 7:00 PM.

Clockwise movement of the gap 62 in the belt 22 occurs as follows: the middle support disc 38 is driven at gear 94 on shaft 74 by gear 34 to rotate clockwise thus simultaneously causing the first side portion 42 of the belt 22 (FIG. 4) to roll down along gap edge 116 to the second side portion 52 of the belt 22 and the second side portion 52 of the belt 22 to roll up along gap edge 118 to the first side portion 42 of the belt 22. Thus for every full circular rotation of the middle support disc 38 there is a complete exchange of the material comprising the first side portion 42 of belt 22 with the material comprising the second side portion 52 of belt 22.

The movement of the gap 62 in the belt 42 is readily apparent to users of the device when observed through the top support disc 36 and the protective cover 28, which are transparent. This movement may be rendered with greater clarity if the top surface 78 of the bottom support disc 40 is colored, as it can be seen through the gap 62 in the belt 22.

Note that the movement in the gap 62 of the belt 22 can be accomplished whether the top support disc 36 and bottom support disc 40 are stationary or driving the revolution of the belt 22 in either direction as described above. Thus it is possible to render at least two distinct indicating functions simultaneously.

I claim:

1. A flexible belt for use as an indicator of an indicating device having a shaft mechanism which rotates about an axis during use of the device, said belt comprising:
   a first discoidal side portion including a first face having a circular periphery, a circular hole in the center of the first face and a slit having two sides which extend radially across the first face from the edge of the circular hole in the center to the circular periphery of said first face; and
   a second discoidal side portion including a second face having a circular periphery, a circular hole in the center of the first face and a slit having two sides which extend radially across the second face from the edge of the circular hole in the center to the circular periphery of said second face; and
   said first side portion and said second side portion being arranged in a back-to-back relationship so that the faces thereof face in opposite directions and so that the slits thereof are positioned in registry and provide a single two-sided gap extending from the edges of the circular holes in the center of each face to the circular peripheries of the side portions;
   said first and second side portions being joined to one another along each side of said two-sided gap and having means for permitting rotation of said side portions by the rotatable shaft mechanism of the indicating device such that said first and second side portions rotate in opposite directions relative to each other about an axis extending through the centers of the faces and a sector of the first side portion moves through the two-sided gap to the belt side corresponding with the face of the second side portion and a sector of the second side portion moves through the two-sided gap to the belt side corresponding with the face of the first side portion so that as the face of one side portion is viewed frontally, the face of the belt side portion being viewed disappears through the gap and the face of the opposite belt side portion appears through the gap; and
   indicia means associated with at least one of the first and second side portions for indicating the positional relationship of the first and second side portions as the side portions are rotated relative to each other as aforesaid.

2. The belt as defined in claim 1 wherein the indicia means includes colors borne by said first and second faces and said first and second faces are different in color for visually informing an observer of the relative position of the side portions as said one side is viewed frontally.

3. The belt as defined in claim 1 wherein the indicia means includes texturing borne by at least one of said first and second faces for informing a user of the relative position of the two side portions as said frontally viewable side portion is touched by the user.

4. The belt as defined in claim 1 wherein said belt is relatively thin and constructed of a plastic material.

5. In an indicating device having a shaft which is rotatable about an axis of rotation during use of the device, means for rotating the shaft about the rotation axis and an indicator associated with said shaft for movement as the shaft is rotated, the improvement comprising:
   a flexible belt for use as the indicator of the device including
   (a) a first discoidal side portion including a first face having a circular periphery, a circular hole in the center of the first face and a slit having two sides which extend radially across the first face from the edge of the circular hole in the center to the circular periphery of said first face and
   (b) a second discoidal side portion including a second face having a circular periphery, a circular hole in the center of the second face and a slit having two sides which extend radially across the second face from the edge of the circular hole in the center to the circular periphery of said second side portion, said first side portion and said second side portion being arranged in a back-to-back relationship so that the faces thereof face in opposite directions and so that the slits thereof are positioned in registry and provide a single two-sided gap extending from the edges of the circular holes in the center of the faces to the circular peripheries of the faces, and said first and second side portions being joined to one another along each side of said two-sided gap;
   means for connecting the belt to the rotatable shaft of the device for rotating said first and second side portions in opposite directions relative to each other about an axis extending through the center of and generally perpendicular to said faces so that as a sector of the first side portion moves through the two-sided gap to the belt side corresponding with the face of the second side portion a sector of the second side portion moves through the two-sided gap to the belt side corresponding with the face of the first side portion whereby as the face of one side portion is viewed frontally, the face of the belt side portion being viewed disappears through the gap, and the face of the opposite belt side portion appears through the gap; and
   indicia means associated with at least one of the first and second side portions for indicating the positional relationship of the first and second side portions as the side portions are rotated relative to each other as aforesaid.

6. The improvement of claim 5 wherein the indicia means includes colors borne by said first and second faces and said first and second faces are different in color for visually informing an observer of the relative position of the side portions as said one side portion is viewed frontally.

7. The improvement of claim 5 wherein the indicia means includes texturing borne by at least one of said first and second faces for informing a user of the relative position of the two side portions as said frontally viewable side portion is touched by the user.

8. The improvement of claim 5 wherein said belt is relatively thin and constructed of a plastic material.

* * * * *